(12) United States Patent
Lu et al.

(10) Patent No.: US 12,253,243 B1
(45) Date of Patent: Mar. 18, 2025

(54) HIGH STRUCTURAL STABILITY JUNCTION BOX AND PANEL LIGHT HAVING THE SAME

(71) Applicant: Xiamen PVTECH Co., Ltd., Fujian (CN)

(72) Inventors: Fuxing Lu, Fujian (CN); Sishan Liao, Fujian (CN); Liangliang Cao, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 18/655,310

(22) Filed: May 5, 2024

(30) Foreign Application Priority Data

Nov. 10, 2023 (CN) .......................... 202311498530.9

(51) Int. Cl.
*F21V 23/00* (2015.01)
*F21S 8/02* (2006.01)
*H02G 3/08* (2006.01)
*F21Y 105/16* (2016.01)

(52) U.S. Cl.
CPC .............. *F21V 23/002* (2013.01); *F21S 8/02* (2013.01); *H02G 3/085* (2013.01); *F21Y 2105/16* (2016.08)

(58) Field of Classification Search
CPC ........... F21V 23/002; F21S 8/02; H02G 3/085

USPC .......................................................... 362/364
See application file for complete search history.

(56) References Cited

U.S. PATENT DOCUMENTS

| | | | |
|---|---|---|---|
| 10,760,774 B1 * | 9/2020 | Zheng | F21V 29/70 |
| 11,965,647 B1 * | 4/2024 | Xu | F21V 23/004 |
| 2016/0018073 A1 * | 1/2016 | Wronski | F21S 8/026 362/365 |
| 2017/0059135 A1 * | 3/2017 | Jones | F21V 29/763 |
| 2017/0363261 A1 * | 12/2017 | White | F21V 23/008 |
| 2019/0226669 A1 * | 7/2019 | Winters | F21V 21/042 |
| 2020/0158122 A1 * | 5/2020 | Huang | F24F 7/007 |
| 2020/0300428 A1 * | 9/2020 | Momin | F21V 21/04 |
| 2021/0317977 A1 * | 10/2021 | Jeswani | H05B 45/385 |
| 2022/0357003 A1 * | 11/2022 | Mathews | F21S 8/026 |
| 2024/0167671 A1 * | 5/2024 | Winters | F21V 17/18 |

* cited by examiner

*Primary Examiner* — Christopher M Raabe
(74) *Attorney, Agent, or Firm* — Winston Hsu

(57) ABSTRACT

A high structural stability junction box includes a first side wall, a second side wall, a third side wall and a top surface. The first side wall has a first locking edge, a first inclined edge, and a first fixing edge. The first locking edge is connected to the first fixing edge via the first inclined edge. The second side wall is opposite to the first side wall, and has a second locking edge, a second inclined edge, and a second fixing edge. The second locking edge is connected to the second fixing edge via the second inclined edge. The third side wall is opposite to the fourth side wall. The top surface has four side edges. The first side wall, the second side wall, the third side wall, and the fourth side wall extend from the four side edges, respectively.

6 Claims, 9 Drawing Sheets

HIGH STRUCTURAL STABILITY JUNCTION BOX AND PANEL LIGHT HAVING THE SAME

BACKGROUND OF THE INVENTION

1. Field of the Invention

The present invention relates to a junction box, in particular to a high structural stability junction box. The present invention further relates to the panel light having the junction box.

2. Description of the Prior Art

Currently available junction boxes used in panel lights are mainly divided into two types. The first type of junction box is integrated with the power supply box. The second type of junction box is an external device that can be mounted behind the panel light. However, the first type of junction box cannot provide sufficient space to accommodate various electric wires, so the first type of junction box cannot meet actual requirements. On the other hand, the second type of junction box is of high cost and difficult to install. Therefore, the second type of junction box is very inconvenient in use and directly increases the overall cost of panel lights.

SUMMARY OF THE INVENTION

One embodiment of the present invention provides a high structural stability junction box includes a first side wall, a second side wall, a third side wall and a top surface. The first side wall has a first locking edge, a first inclined edge, and a first fixing edge. The first locking edge is connected to the first fixing edge via the first inclined edge. The second side wall is opposite to the first side wall, and has a second locking edge, a second inclined edge, and a second fixing edge. The second locking edge is connected to the second fixing edge via the second inclined edge. The third side wall is opposite to the fourth side wall. The top surface has four side edges. The first side wall, the second side wall, the third side wall, and the fourth side wall extend from the four side edges, respectively.

In one embodiment, the first locking edge has a first locking portion, and the second locking edge has a second locking portion.

In one embodiment, the first locking portion is a locking sheet, and there is an included angle between the locking sheet and a horizontal plane, wherein the horizontal plane is parallel to the top surface.

In one embodiment, the first fixing edge has a first fixing wing, and the second fixing edge has a second fixing wing.

In one embodiment, the first side wall has a first knock-out hole, the second side wall has a second knock-out hole, the third side wall has a third knock-out hole, and the top surface has a top knock-out hole.

Another embodiment of the present invention provides a panel light having a high structural stability junction box, which includes a backboard, a light source board, a light cover and a junction box. The backboard has an opening and a step structure. The opening is disposed on one side of the backboard, and the step structure is disposed on another side of the backboard. The light source board is disposed inside the backboard. The light cover is disposed on the backboard and covers the opening.

In one embodiment, a junction box is disposed on the step structure. The junction box has a first side wall, a second side wall opposite to the first side wall, a third side wall, a fourth side wall opposite to the third side wall, and a top surface. The shape of the first side wall and the shape of the second side wall are corresponding to the shape of the step structure. The first side wall has a first locking edge, a first inclined edge, and a first fixing edge. The first locking edge is connected to the first fixing edge via the first inclined edge. The second side wall has a second locking edge, a second inclined edge, and a second fixing edge. The second locking edge is connected to the second fixing edge via the second inclined edge. The top surface has four side edges. The first side wall, the second side wall, the third side wall, and the fourth side wall extend from the four side edges, respectively.

In one embodiment, the first locking edge has a first locking portion, and the second locking edge has a second locking portion.

In one embodiment, the first locking portion is a locking sheet, and there is an included angle between the locking sheet and a horizontal plane, wherein the horizontal plane is parallel to the top surface.

In one embodiment, the first fixing edge has a first fixing wing, and the second fixing edge has a second fixing wing.

In one embodiment, the first side wall has a first knock-out hole, the second side wall has a second knock-out hole, the third side wall has a third knock-out hole, and the top surface has a top knock-out hole.

The high structural stability junction box and the panel light having the same in accordance with the embodiments of the present invention may have the following advantages:

(1) In one embodiment of the present invention, the junction box includes a first side wall, a second side wall, a third side wall and a top surface. The first side wall has a first locking edge, a first inclined edge, and a first fixing edge. The first locking edge is connected to the first fixing edge via the first inclined edge. The second side wall is opposite to the first side wall, and has a second locking edge, a second inclined edge, and a second fixing edge. The second locking edge is connected to the second fixing edge via the second inclined edge. The third side wall is opposite to the fourth side wall. The top surface has four side edges. The first side wall, the second side wall, the third side wall, and the fourth side wall extend from the four side edges, respectively. The shapes of the first side wall and the second side wall are corresponding to the shape of the backboard of the panel light. Thus, the junction box described above can be detachably fixed to the backboard, so the installation process thereof can be simple. Therefore, the junction box is very convenient in use and more comprehensive in application.

(2) In one embodiment of the present invention, the junction box can be detachably fixed to the backboard of the panel light, and the junction box can protrude from the backboard. The above-described structural design can effectively increase the internal space of the junction box, such that the junction box can accommodate more electric wires. Therefore, the structural design of the junction box can indeed satisfy actual requirements.

(3) In one embodiment of the present invention, the junction box can be detachably fixed to the backboard of the panel light, so the junction box can be used as an accessory attached to the panel light and sold as a separate product. Additionally, the structural design of the junction box is simple. Therefore, the manufacturing cost and transportation cost of the junction box can be greatly reduced, so the overall cost of the panel light can be decreased. Thus, the junction box can conform to the needs of different applications.

(4) In one embodiment of the present invention, the junction box has a first side wall, a second side wall, a third side wall, a fourth side wall, and a top surface. Several knock-out holes are distributed on these components, and each knock-out hole can be used to connect electric wires. The shapes of the first side wall and the second side wall are corresponding to the shape of the step structure. The first locking edge and the first fixing edge of the first side wall can be fixed to the backboard of the panel light, and the first locking edge is connected to the first fixing edge via the first inclined edge of the first side wall. The second locking edge and the second fixing edge of the second side wall can be fixed to the backboard, and the second locking edge is connected to the second fixing edge via the second inclined edge of the second side wall. Via the design of the composite fixing structure integrating the inclined surface, locking edges, and fixing edges with each other, the junction box can effectively withstand external forces applied to the first side wall, the second side wall, the third side wall, the fourth side wall, and the top surface. Therefore, the junction box can achieve high structural stability.

(5) In one embodiment of the present invention, the first locking edge of the first side wall of the junction box has a first locking portion. The first locking portion is a locking sheet, and there is an included angle between the locking sheet and a horizontal plane parallel to the top surface. When the locking sheet is fixed to the backboard of the panel light, the structure of the locking sheet can provide a downward torsion. The structural design of the inclined locking sheet can push the junction box towards the backboard of the panel light, thereby stabilizing the junction box more effectively on the backboard. Therefore, the structural stability of the junction box can be further improved.

(6) In one embodiment of the present invention, the shapes of the first side wall and the second side wall of the junction box are corresponding to the shape of the step structure of the panel light. Additionally, the first locking edge of the first side wall has an inclined structure. With the above structure, the gap between the junction box and the backboard of the panel light can be reduced to prevent dust or other foreign objects from entering the junction box so as to effectively avoid that the panel light malfunctions. Therefore, the reliability of the panel light can be effectively improved, and the service life of the panel light can be extended.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
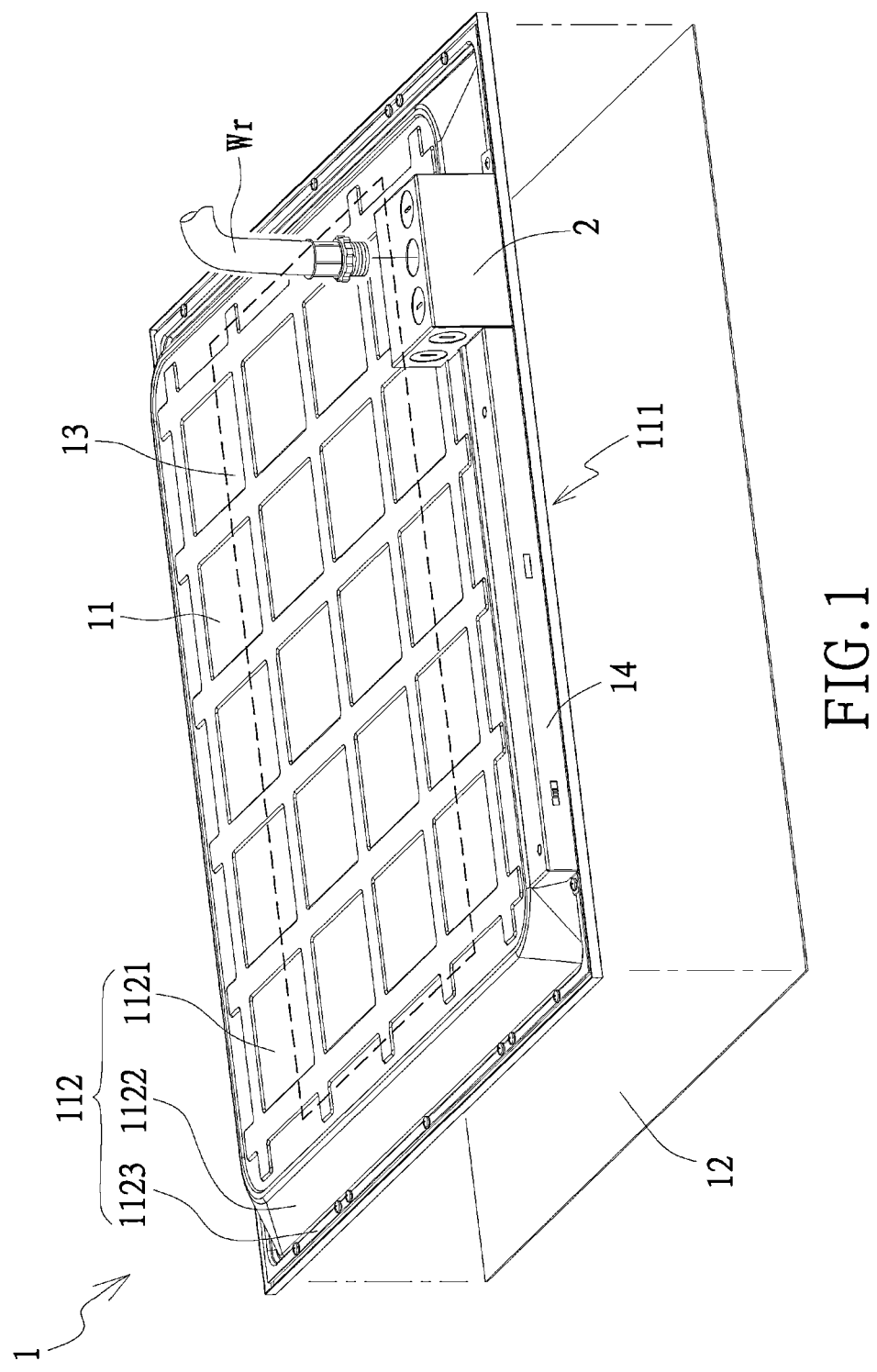
FIG. 1 is an exploded view of a panel light having a high structural stability junction box in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
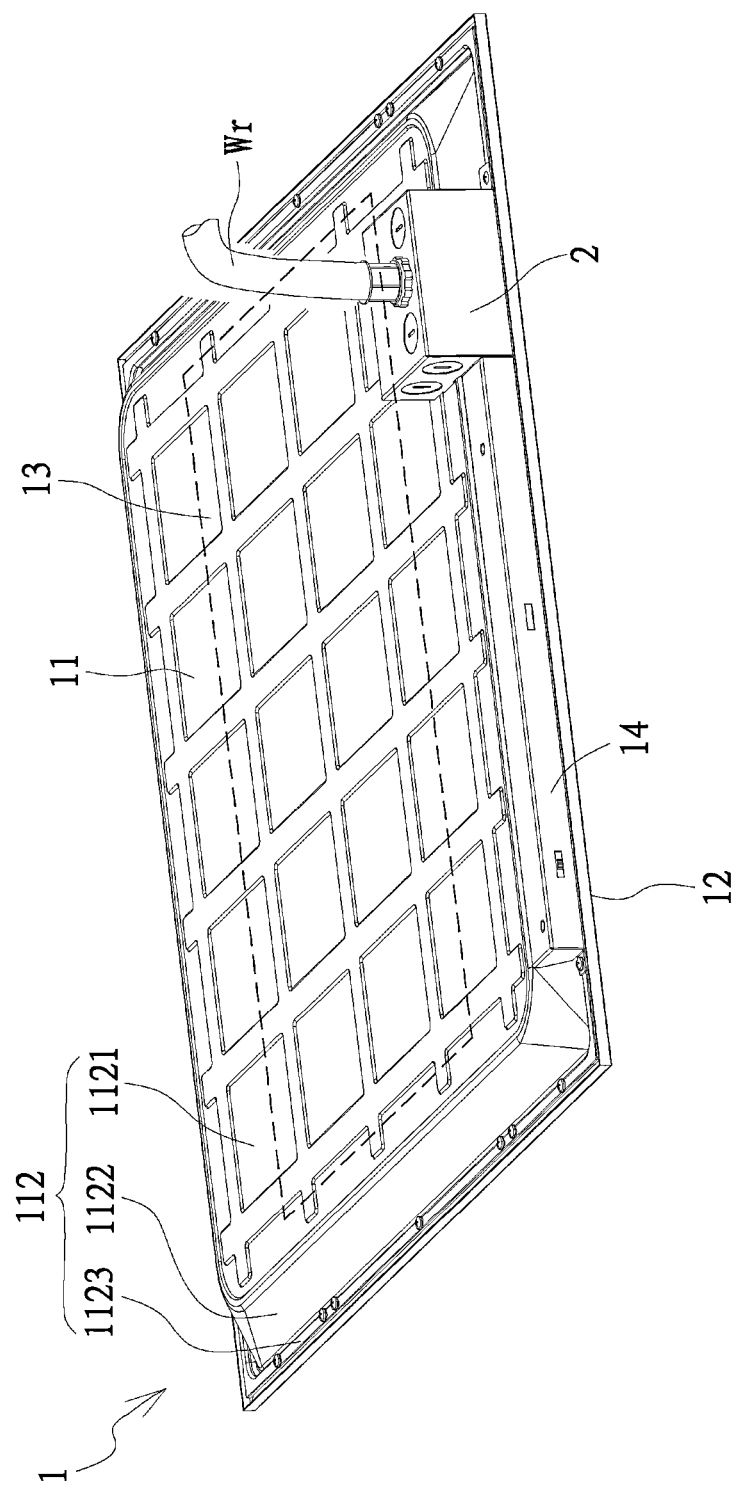
FIG. 2 is a perspective view of the panel light having the high structural stability junction box in accordance with one embodiment of the present invention.

Please refer to FIG. 1 and FIG. 2. FIG. 1 is an exploded view of a panel light having a high structural stability junction box in accordance with one embodiment of the present invention. FIG. 2 is a perspective view of the panel light having the high structural stability junction box in accordance with one embodiment of the present invention. As shown in FIG. 1 and FIG. 2, the panel light 1 includes a backboard 11, a light cover 12, a light source panel 13, and a power supply box 14. The backboard 11 has an opening 111 and a step structure 112. The opening 111 is disposed on one side of the backboard 11, and the step structure 112 is disposed on the other side of the backboard 11. In one embodiment, the backboard 11 may be made of a metal material such as aluminum, copper, stainless steel, etc. In another embodiment, the backboard 11 may be made of a non-metal material, such as plastics.

The light source panel 13 is disposed inside the backboard 11. In one embodiment, the light source panel 13 may include a circuit board and a plurality of light sources (such as LEDs, LED arrays, etc.). In another embodiment, the light source panel 13 may also be replaceable with a light tubes, bulb, or similar components.

The step structure 112 includes a top plane 1121, a plurality of inclined planes 1122, and an outer ring portion 1123. In this embodiment, the number of inclined planes 1122 is four. In another embodiment, the number of inclined planes 1122 can be adjusted according to actual needs, and the step structure 112 can also vary according to actual needs.

The power supply box 14 is disposed on the outer ring portion 1123. The power supply box 14 may contain a power module or other necessary components. The structure and function of the power module should be well known to those skilled in the art and thus are not elaborated here.

The junction box 2 is detachably disposed on the step structure 112. The electric wire Wr can be a power line; one end of the electric wire Wr is connected to the power supply box 14 via the junction box 2, and the other end of the electric wire Wr can be connected to an external power source (such as a utility power, generator, etc.). The number of electric wires Wr can be two or more; one of the electric wires Wr is a power line, and the other one can be a sensor line or other similar components.

The embodiment just exemplifies the present invention and is not intended to limit the scope of the present invention; any equivalent modification and variation according to the spirit of the present invention is to be also included within the scope of the following claims and their equivalents.

Figure 3:
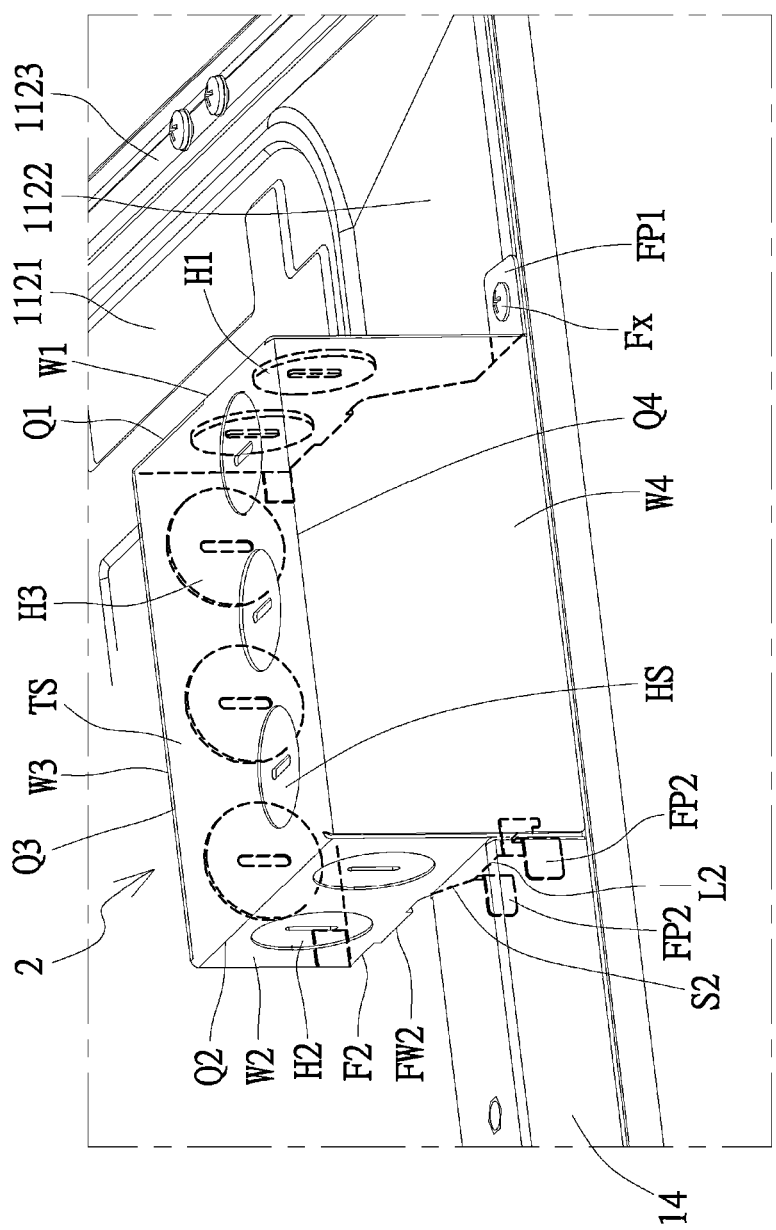
FIG. 3 is a first schematic view of the high structural stability junction box in accordance with one embodiment of the present invention.
Figure 4:
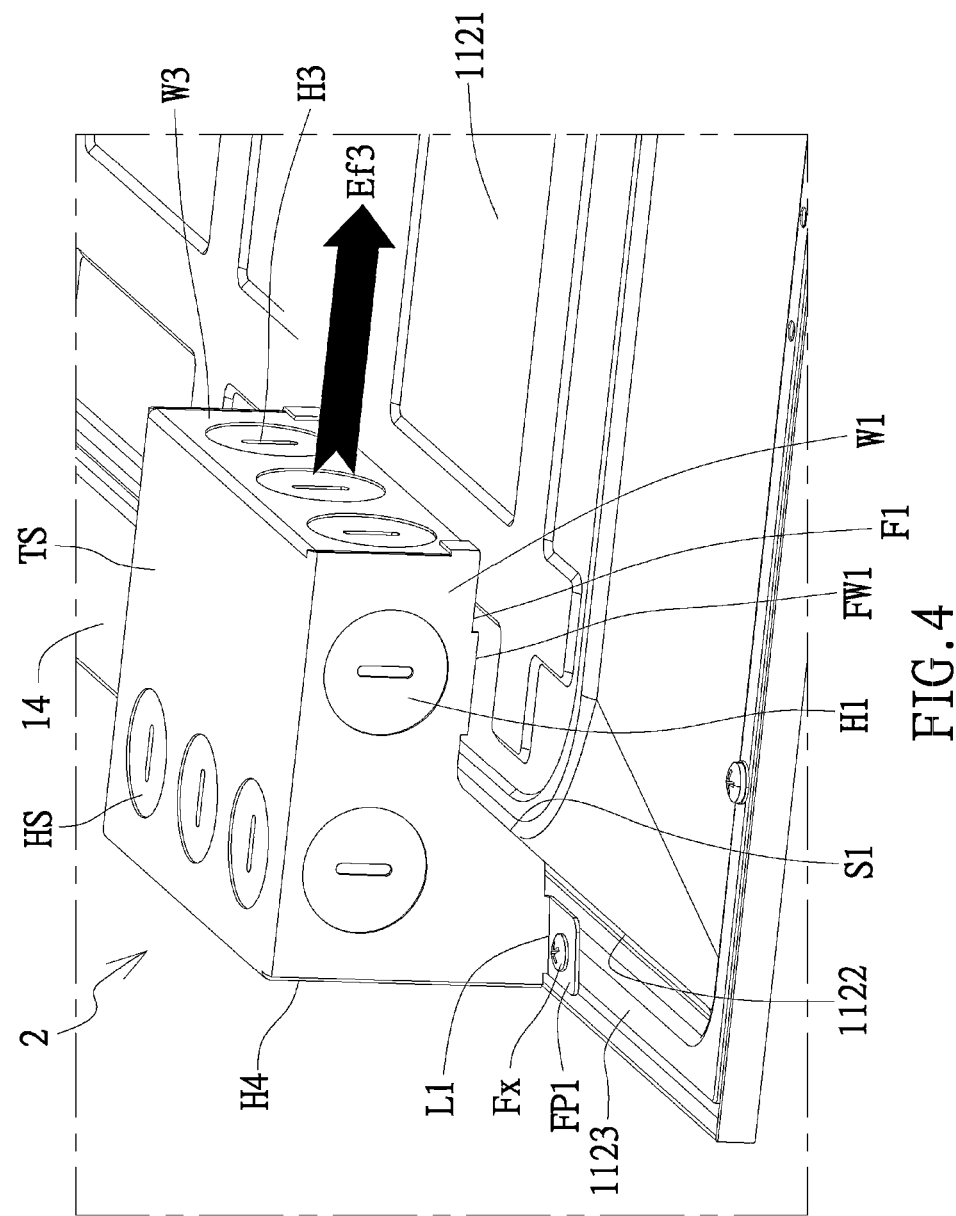
FIG. 4 is a second schematic view of the high structural stability junction box in accordance with one embodiment of the present invention.

Please refer to FIG. 3 and FIG. 4, which are a first schematic view and a second schematic view of the high structural stability junction box in accordance with one embodiment of the present invention. As shown in FIG. 3 and FIG. 4, the junction box 2 includes a first side wall W1, a second side wall W2, a third side wall W3, a fourth side wall W4, and a top surface TS.

The top surface TS has four side edges Q1, Q2, Q3, Q4. The first side wall W1, the second side wall W2, the third side wall W3, and the fourth side wall W4 extend from the four side edges Q1, Q2, Q3, Q4, respectively. The top surface TS may have three top knock-out holes HS, the number of which can be adjusted according to actual needs.

The first side wall W1 has a first locking edge L1, a first inclined edge S1, and a first fixing edge F1. The first locking edge L1 is connected to the first fixing edge F1 via the first inclined edge S1. The first locking edge L1, the first inclined edge S1, and the first fixing edge F1 are in contact with the outer ring portion 1123, one of the inclined planes 1122, and the top plane 1121, respectively. The first side wall W1 may have two first knock-out holes H1, the number of which can be adjusted according to actual needs. The first locking edge L1 has a first locking portion FP1. In this embodiment, the first locking portion FP1 is a locking sheet, which can be fixed to the outer ring portion 1123 by a locking element Fx (such as a screw, nail, etc.). Additionally, there is an included angle between the first locking edge L1 (locking sheet) and a horizontal plane parallel to the top surface TS. When the first locking edge L1 is fixed to the backboard 11 of the panel light 2, the structure of the first locking edge L1 can provide a downward torsion. The first fixing edge F1 has a first fixing wing FW1, and the first fixing edge F1 is fixed to the top plane 1121 via the first fixing wing FW1. Thus, the first inclined edge S1 can be closely attached to the inclined plane 1122.

The second side wall W2 is opposite to the first side wall W1. The second side wall W2 has a second locking edge L2, a second inclined edge S2, and a second fixing edge D2. The second locking edge L2 is connected to the second fixing edge D2 via the second inclined edge S2. The second locking edge L2, the second inclined edge S2, and the second fixing edge D2 are in contact with the outer ring portion 1123, one of the inclined planes 1122, and the top plane 1121, respectively. The second side wall W2 may have two second knock-out holes H2, the number of which can be adjusted according to actual needs. The second locking edge L2 has a second locking portion FP2. In this embodiment, the second locking edge L2 has two second locking portions FP2, and the two second locking portions FP2 are dowels. One side of the power supply box 14 has two slots corresponding to the two second locking portions FP2, so the two second locking portions FP2 can be respectively inserted into the two slots, and the two second locking portions FP2 can be fixed to the power supply box 14. In another embodiment, the two second locking portions FP2 can also be directly fixed to the outer ring portion 1123 by other fixing mechanisms. The second fixing edge D2 has a second fixing wing FW2, and the second fixing edge D2 is fixed to the top plane 1121 via the second fixing wing FW2. Thus, the second inclined edge S2 can be closely attached to the inclined plane 1122.

The third side wall W3 is opposite to the fourth side wall W4. The third side wall W3 has three third knock-out holes H3. The number of third knock-out holes H3 can be adjusted according to actual needs.

As previously stated, the junction box 2 can be detachably fixed to the backboard 11 with a simple installation process. Therefore, the junction box 2 is very convenient in use and can be more comprehensive in application.

Additionally, the junction box 2 can be detachably fixed to the backboard 11 of the panel light 1, and the junction box 2 can protrude from the backboard 11. The above structural design can effectively increase the internal space of the junction box 2, such that the junction box 2 can accommodate more electric wires Wr. Therefore, the structural design of the junction box 2 can indeed meet actual requirements.

Furthermore, the junction box 2 can be detachably fixed to the backboard 11 of the panel light 1, so the junction box 2 can be used as an accessory attached to the panel light 1 and sold as a separate product. Additionally, the structural design of the junction box 2 is simple. Therefore, the manufacturing cost and transportation cost of the junction box 2 can be greatly reduced, so the overall cost of the panel light 1 can be decreased. Thus, the junction box 2 can meet the needs of different applications.

If the user connects the electric wire Wr to the junction box 2 through any one of the third knock-out holes H3 of the third side wall W3, the external force Ef3 acting on the junction box 2 will be applied to the third side wall W3. At this time, the first fixing wing FW1 and the second fixing wing FW2 can bear a portion of the external force Ef3. At the same time, the first inclined edge S1 can provide directional adjustment for the external force, so that the first locking portion FP1 and the second locking portion FP2 bear another portion of the external force Ef3 in the direction of the external force Ef3. Therefore, the junction box 2 can effectively withstand the external force applied to the third side wall W3 with a view to achieving high structural stability.

The embodiment just exemplifies the present invention and is not intended to limit the scope of the present invention; any equivalent modification and variation according to the spirit of the present invention is to be also included within the scope of the following claims and their equivalents.

Figure 5:
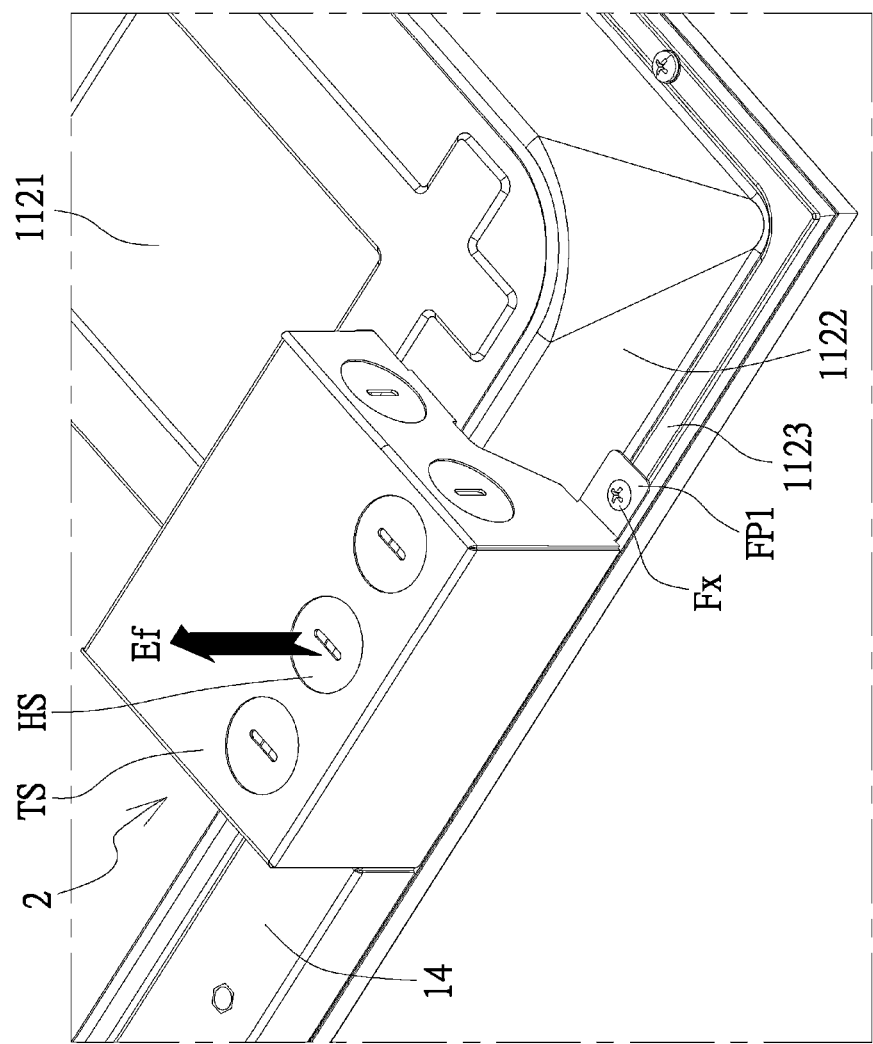
FIG. 5 is a third schematic view of the high structural stability junction box in accordance with one embodiment of the present invention.

Please refer to FIG. 5, which is a third schematic view of the high structural stability junction box in accordance with one embodiment of the present invention, and please also refer to FIGS. 3 and 4 simultaneously. As shown in these figures, if the user connects the electric wire Wr to the junction box 2 through any of the top knock-out holes HS on the top surface TS, the external force Ef will be applied to the top surface TS. At this time, since the top knock-out hole HS is located above the first locking portion FP1 and the second locking portion FP2, the direction of the external force Ef is substantially perpendicular to the line connecting the first locking portion FP1 and the second locking portion FP2, such that the first locking portion FP1 and the second locking portion FP2 can effectively withstand the external force Ef.

Similarly, if the top knock-out hole HS is located above the first fixing wing FW1 and the second fixing wing FW2, the direction of the external force Ef is substantially perpendicular to the line connecting the first fixing wing FW1 and the second fixing wing FW2, such that the first fixing wing FW1 and the second fixing wing FW2 can effectively withstand the external force Ef. Therefore, the junction box 2 can effectively withstand the external force applied to the top surface TS so as to achieve high structural stability.

Of course, this embodiment is provided for illustrative purposes only and does not limit the scope of the present invention. Equivalent modifications or variations based on the high structural stability junction box of this embodiment and the panel light having such a junction box should still be included within the scope of the present invention.

Figure 6:
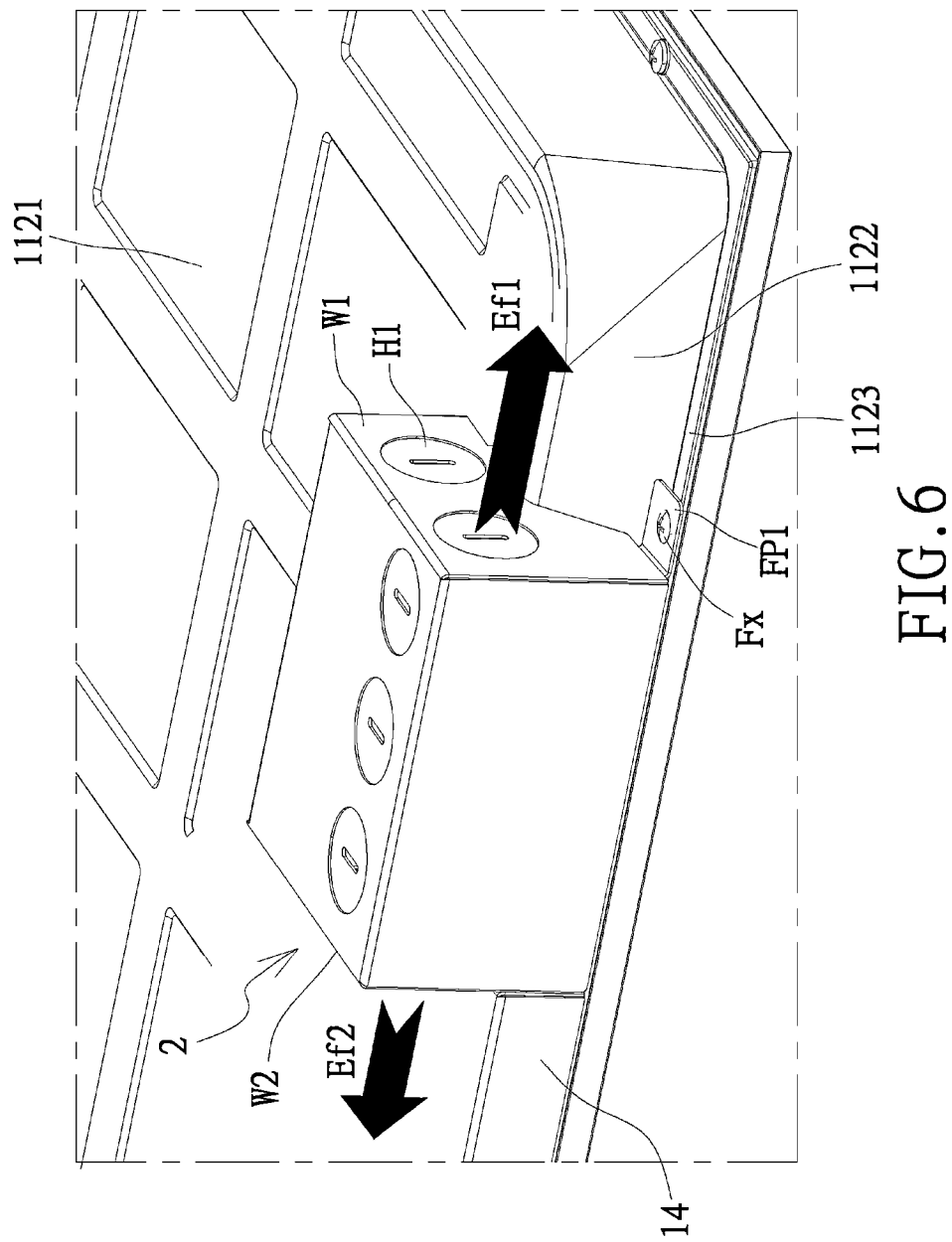
FIG. 6 is a fourth schematic view of the high structural stability junction box in accordance with one embodiment of the present invention.

Please refer to FIG. 6, which is a fourth schematic view of the high structural stability junction box in accordance with one embodiment of the present invention, and please also refer to FIG. 3 and FIG. 4 simultaneously. As shown in these figures, if the user connects the electric wire Wr to the junction box 2 through the first knock-out hole H1, adjacent to the first fixing wing FW1, of the first side wall W1, the external force Ef1 applied to the junction box 2 will be exerted on the first side wall W1. At this time, since the first knock-out hole H1 is located above and adjacent to the first fixing wing FW1, the first fixing wing FW1 can bear most of the external force Ef1. Additionally, as the direction of the external force Ef1 is substantially perpendicular to the line connecting the first fixing wing FW1 and the second fixing wing FW2, the second fixing wing FW2 can also bear a portion of the external force Ef1. Therefore, the first fixing wing FW1 and the second fixing wing FW2 can effectively withstand the external force Ef1.

If the user connects the electrical connecting wire Wr to the junction box 2 through the first knock-out hole H1, adjacent to the first locking portion FP1, of the first side wall W1, the external force Ef1 applied to the junction box 2 will be exerted on the first side wall W1. At this time, since the first knock-out hole H1 is located above and adjacent to the first locking portion FP1, the first locking portion FP1 can bear most of the external force Ef1. Additionally, as the direction of the external force Ef1 is substantially perpendicular to the line connecting the first locking portion FP1 and the second locking portion FP2, the second locking portion FP2 can also bear a portion of the external force Ef1. Therefore, the first locking portion FP1 and the second locking portion FP2 can effectively withstand the external force Ef1.

Similarly, if the user connects the electric wire Wr to the junction box 2 through the second knock-out hole H2, adjacent to the second fixing wing FW2, of the second side wall W2, the external force Ef2 applied to the junction box 2 will be exerted on the second side wall W2. At this time, since the second knock-out hole H2 is located above and adjacent to the second fixing wing FW2, the second fixing wing FW2 can bear most of the external force Ef2. Additionally, as the direction of the external force Ef2 is essentially perpendicular to the line connecting the first fixing wing FW1 and the second fixing wing FW2, the first fixing wing FW2 can also bear a portion of the external force Ef2. Therefore, the first fixing wing FW1 and the second fixing wing FW2 can effectively withstand the external force Ef2.

If the user connects the electrical connecting wire Wr to the junction box 2 through the second knock-out hole H2, adjacent to the second locking portion FP2, of the second side wall W2, the external force Ef2 applied to the junction box 2 will be exerted on the second side wall W2. At this time, since the second knock-out hole H2 is located above and adjacent to the second locking portion FP2, the second locking portion FP2 can bear most of the external force Ef2. Additionally, as the direction of the external force Ef2 is substantially perpendicular to the line connecting the first locking portion FP1 and the second locking portion FP2, the first locking portion FP1 can also bear a portion of the external force Ef2. Therefore, the first locking portion FP1 and the second locking portion FP2 can effectively withstand the external force Ef2.

As a result, the junction box 2 can effectively withstand the external force applied to the first side wall W1 or the second side wall W2, so the junction box 2 can indeed achieve high structural stability.

As described above, in this embodiment, the shapes of the first side wall W1 and the second side wall W2 are corresponding to the shape of the backboard 11 of the panel light 1. Thus, the junction box 2 mentioned above can be detachably fixed to the backboard 11, and the installation process is simple. Therefore, the junction box 2 is very convenient in use and can be more comprehensive in application.

Furthermore, in this embodiment, the junction box 2 can be detachably fixed to the backboard 11 of the panel light 1, and the junction box 2 can protrude from the backboard 11. The above structural design can effectively increase the internal space of the junction box 2, so the junction box 2 can accommodate more electric wires Wr. Therefore, the structural design of the junction box 2 can indeed meet the actual requirements.

Moreover, in this embodiment, the junction box 2 can be detachably fixed to the backboard 11 of the panel light 1, so the junction box 2 can be used as an accessory external to the panel light 1 and sold as a separate product. Additionally, the structural design of the junction box 2 is simple. Therefore, the manufacturing cost and transportation cost of the junction box 2 can be significantly reduced, thereby reducing the overall cost of the panel light 1. Consequently, the junction box 2 can meet the requirements of different applications.

Furthermore, in this embodiment, the junction box 2 has the first side wall W1, the second side wall W2, the third side wall W3, the fourth side wall W4, and the top surface TS. Multiple knock-out holes are distributed on these components, and each knock-out hole can be used to connect electric wires Wr. The shapes of the first side wall W1 and the second side wall W2 are corresponding to the shape of the step structure 112. The first locking edge L1 and the first fixing edge F1 of the first side wall W1 can be fixed to the backboard 11 of the panel light 1, and the first locking edge L1 is connected to the first fixing edge F1 through the first inclined edge S1 of the first side wall W1. The second locking edge L2 and the second fixing edge F2 of the second side wall W2 can be fixed to the backboard 11, and the second locking edge L2 is connected to the second fixing edge L2 through the second inclined edge S2 of the second side wall W2. Via the design of the composite fixing structure integrating the inclined surface, locking edges, and fixing edges with each other, the junction box can effectively withstand external forces applied to the first side wall W1, the second side wall W2, the third side wall W3, the fourth side wall W4, and the top surface TS. Therefore, the structural stability of the junction box 2 can be greatly enhanced.

The embodiment just exemplifies the present invention and is not intended to limit the scope of the present invention; any equivalent modification and variation according to the spirit of the present invention is to be also included within the scope of the following claims and their equivalents.

It is worthy to point out that currently available junction boxes used in panel lights are mainly divided into two types. The first type of junction box is integrated with the power supply box. The second type of junction box is an external device that can be mounted behind the panel light. However, the first type of junction box cannot provide sufficient space to accommodate various electric wires, so the first type of junction box cannot meet actual requirements. On the other hand, the second type of junction box is of high cost and difficult to install. Therefore, the second type of junction box is very inconvenient in use and directly increases the overall cost of panel lights. By contrast, according to the embodiments of the present invention, the junction box includes a first side wall, a second side wall, a third side wall and a top surface. The first side wall has a first locking edge, a first inclined edge, and a first fixing edge. The first locking edge is connected to the first fixing edge via the first inclined edge. The second side wall is opposite to the first side wall, and has a second locking edge, a second inclined edge, and a second fixing edge. The second locking edge is connected to the second fixing edge via the second inclined edge. The third side wall is opposite to the fourth side wall. The top surface has four side edges. The first side wall, the second side wall, the third side wall, and the fourth side wall extend from the four side edges, respectively. The shapes of the first side wall and the second side wall are corresponding to the shape of the backboard of the panel light. Thus, the junction box described above can be detachably fixed to the backboard, so the installation process thereof can be simple. Therefore, the junction box is very convenient in use and more comprehensive in application.

According to the embodiments of the present invention, the junction box can be detachably fixed to the backboard of the panel light, and the junction box can protrude from the backboard. The above-described structural design can effectively increase the internal space of the junction box, such that the junction box can accommodate more electric wires. Therefore, the structural design of the junction box can indeed satisfy actual requirements.

Also, according to the embodiments of the present invention, the junction box can be detachably fixed to the backboard of the panel light, so the junction box can be used as an accessory attached to the panel light and sold as a separate product. Additionally, the structural design of the junction box is simple. Therefore, the manufacturing cost and transportation cost of the junction box can be greatly reduced, so the overall cost of the panel light can be decreased. Thus, the junction box can conform to the needs of different applications.

Further, according to the embodiments of the present invention, the junction box has a first side wall, a second side wall, a third side wall, a fourth side wall, and a top surface. Several knock-out holes are distributed on these components, and each knock-out hole can be used to connect electric wires. The shapes of the first side wall and the second side wall are corresponding to the shape of the step structure. The first locking edge and the first fixing edge of the first side wall can be fixed to the backboard of the panel light, and the first locking edge is connected to the first fixing edge via the first inclined edge of the first side wall. The second locking edge and the second fixing edge of the second side wall can be fixed to the backboard, and the second locking edge is connected to the second fixing edge via the second inclined edge of the second side wall. Via the design of the composite fixing structure integrating the inclined surface, locking edges, and fixing edges with each other, the junction box with each other can effectively withstand external forces applied to the first side wall, the second side wall, the third side wall, the fourth side wall, and the top surface. Therefore, the junction box can achieve high structural stability.

Moreover, according to the embodiments of the present invention, the first locking edge of the first side wall of the junction box has a first locking portion. The first locking portion is a locking sheet, and there is an included angle between the locking sheet and a horizontal plane parallel to the top surface. When the locking sheet is fixed to the backboard of the panel light, the structure of the locking sheet can provide a downward torsion. The structural design of the inclined locking sheet can push the junction box towards the backboard of the panel light, thereby stabilizing the junction box more effectively on the backboard. Therefore, the structural stability of the junction box can be further improved.

Furthermore, according to the embodiments of the present invention, the shapes of the first side wall and the second side wall of the junction box are corresponding to the shape of the step structure of the panel light. Additionally, the first locking edge of the first side wall has an inclined structure. With the above structure, the gap between the junction box and the backboard of the panel light can be reduced to prevent dust or other foreign objects from entering the junction box so as to effectively avoid that the panel light malfunctions. Therefore, the reliability of the panel light can be effectively improved, and the service life of the panel light can be extended. As set forth above, the high structural stability junction box according to the embodiments of the present invention can indeed achieve great technical effects.

Figure 7:
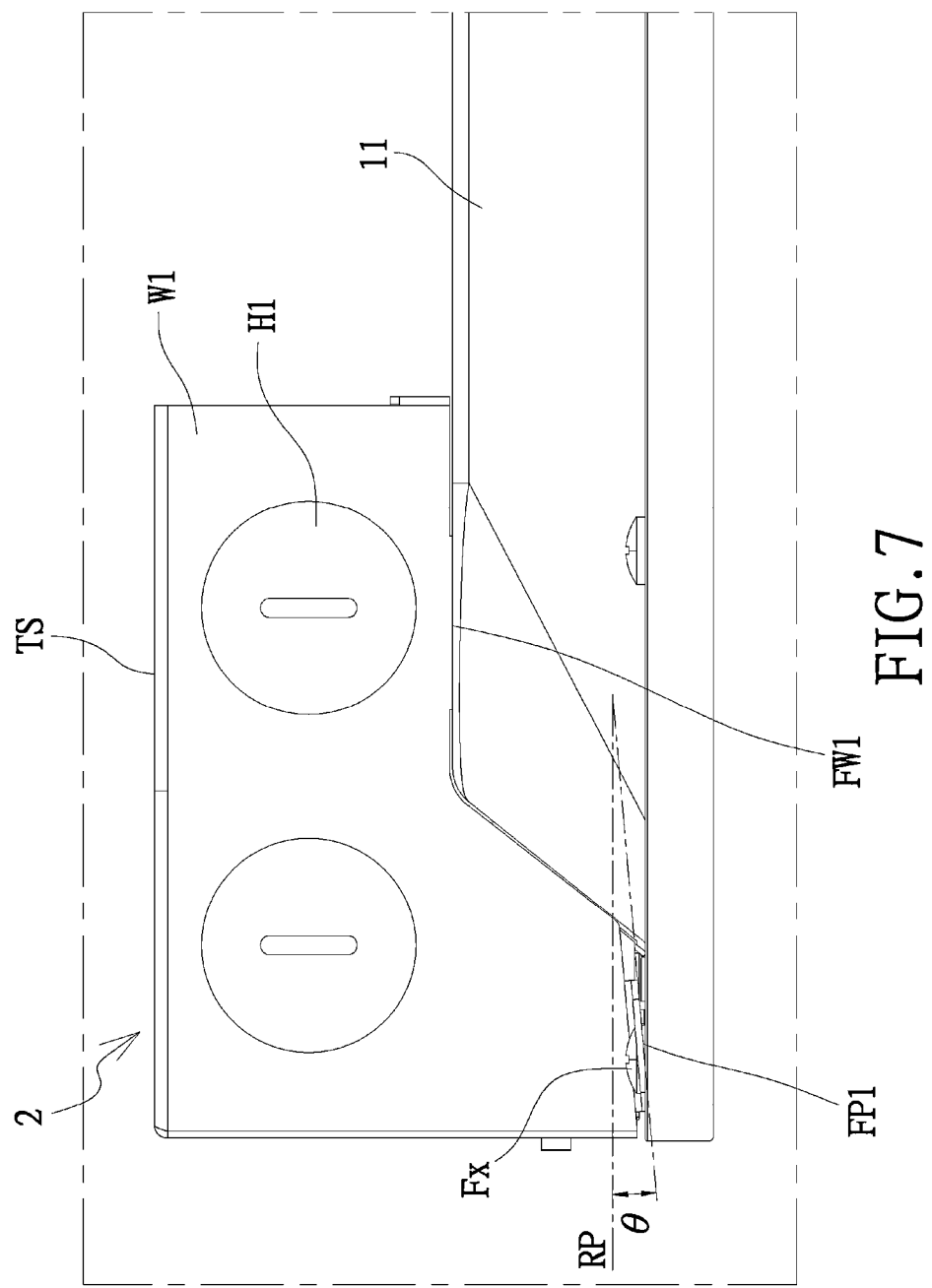
FIG. 7 is a fifth schematic view of the high structural stability junction box in accordance with one embodiment of the present invention.

Please refer to FIG. 7, which is a fifth schematic view of the high structural stability junction box in accordance with one embodiment of the present invention, and please also refer to FIG. 3 and FIG. 4. As shown in these figures, the first locking portion FP1 is a locking sheet, and there is an included angle $\theta$ between the locking sheet and a horizontal plane RP parallel to the top surface TS. When the first locking portion FP1 is fixed to the backboard 11 of the panel light 1, the structure of the first locking portion FP1 can provide a downward torque. The inclined locking sheet structure design mentioned above can push the junction box 2 towards the backboard 11 of the panel light 1, so the junction box 2 can be more stably fixed to the backboard 11. Therefore, the structural stability of the junction box 2 can be further improved.

As set forth above, the first side wall W1 of the junction box 2 has the first locking edge F1, which includes the first locking portion FP1. The first locking portion FP1 is the locking sheet, and there is the included angle θ between the locking sheet and the horizontal plane RP parallel to the top surface TS. When the locking sheet is fixed to the backboard 11 of the panel light 1, the structure of the locking provide a sheet can downward torque. The above-mentioned inclined locking sheet structure design can push the junction box 2 towards the backboard 11 of the panel light 1, enabling the junction box 2 to be more stably fixed to the backboard 11. Therefore, the structural stability of the junction box 2 can be further improved.

Additionally, the shapes of the first side wall W1 and the second side wall W2 of the junction box 2 are corresponding to the step structure 112 of the panel light 1. Moreover, the first locking edge F1 of the first side wall W1 has an inclined structure. Through the above structure, the gap between the junction box 2 and the backboard 11 of the panel light 1 can be reduced to prevent dust or other foreign objects from entering the junction box 2 with a view to effectively avoiding that panel light 1 malfunctions. Therefore, the reliability of the panel light 1 can be effectively improved, and the service life of the panel light 1 can be extended.

The embodiment just exemplifies the present invention and is not intended to limit the scope of the present invention; any equivalent modification and variation according to the spirit of the present invention is to be also included within the scope of the following claims and their equivalents.

Figure 8:
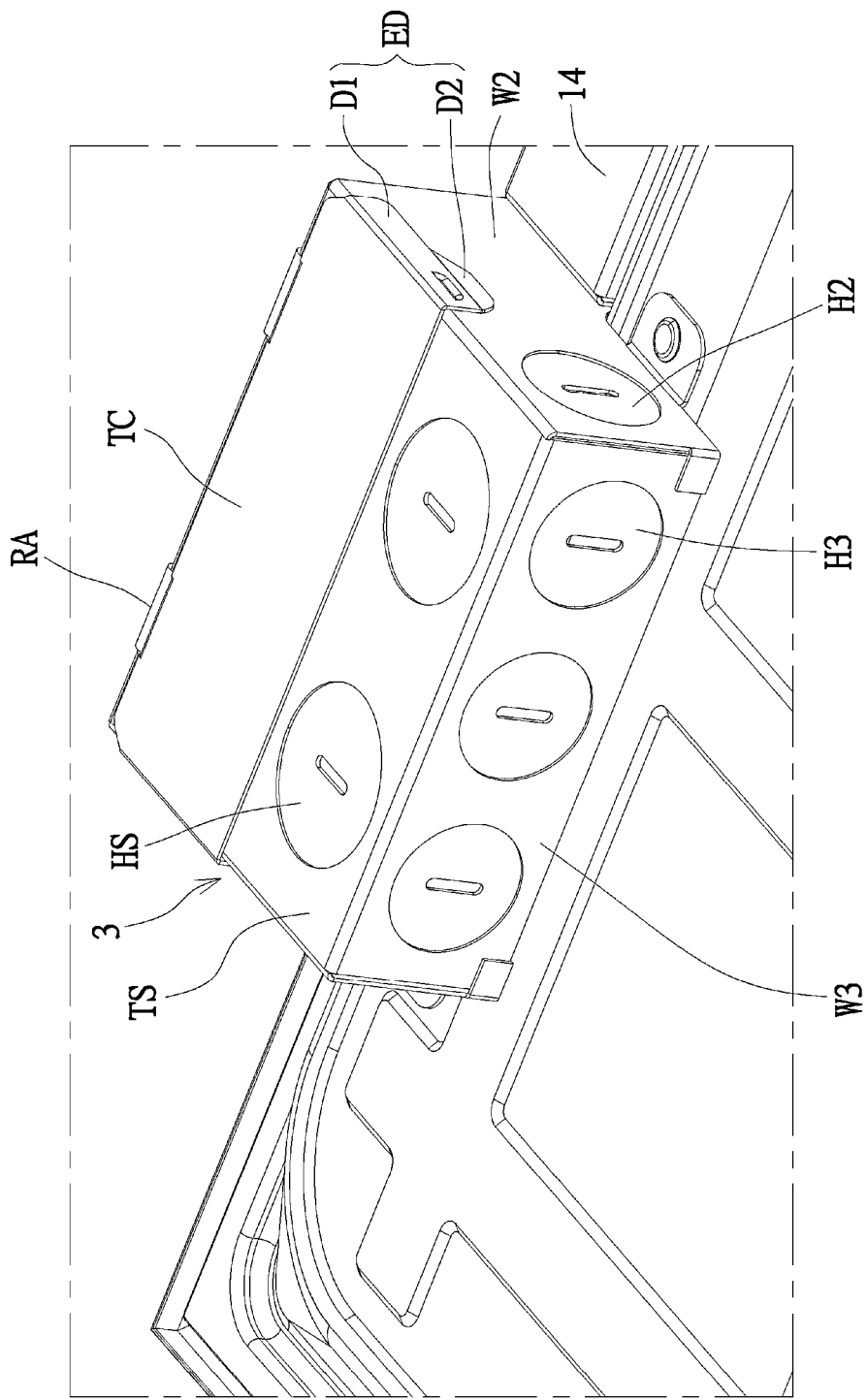
FIG. 8 is a first schematic view of a high structural stability junction box in accordance with another embodiment of the present invention.
Figure 9:
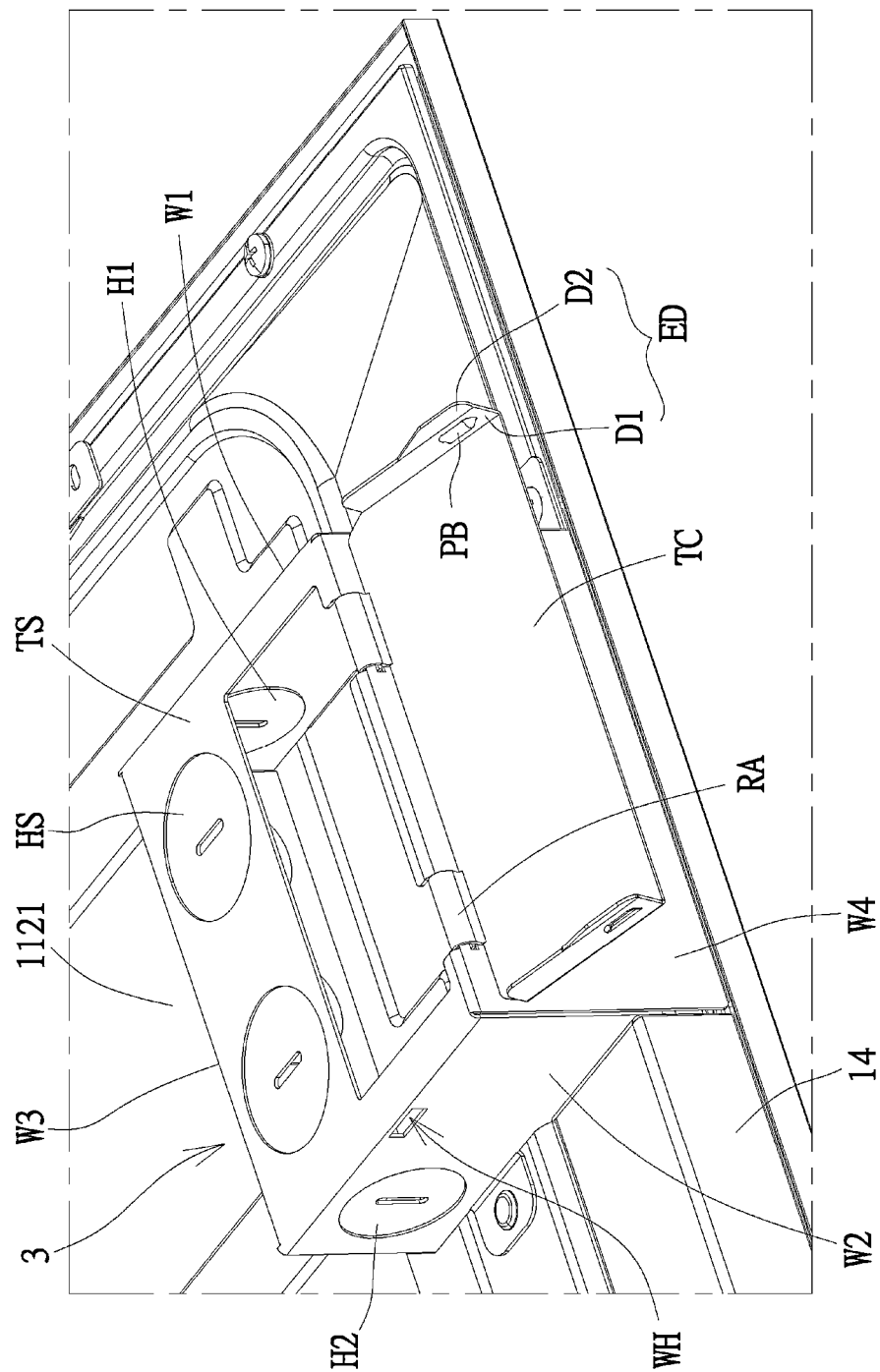
FIG. 9 is a second schematic view of the high structural stability junction box in accordance with another embodiment of the present invention.

Please refer to FIG. 8 and FIG. 9, which are a first schematic view and a second schematic view of a high structural stability junction box in accordance with another embodiment of the present invention, respectively. As shown in FIG. 8 and FIG. 9, the junction box 3 includes the first side wall W1, the second side wall W2, the third side wall W3, the fourth side wall W4, and the top surface TS. The top surface TS has two top knock-out holes HS. The first side wall W1 has a first knock-out hole H1. The second side wall W2 has one second knock-out hole H2 and three third knock-out holes H3.

The structure of the junction box 3 in this embodiment is similar to that of the junction box 2 mentioned above. The difference from the previous embodiment is that the number and position of knock-out holes in the junction box 3 are slightly different. Additionally, the junction box 3 further includes a top cover TC and a rotational shaft RA.

The top cover TC can be rotatably fixed to the top surface TS via the rotational shaft RA to cover the top opening of the top surface TS. The two sides of the top cover TC have two extending wings ED, each of which includes a vertical part D1 and an inclined part D2. One side of the vertical part D1 has a protruding block PB. The first side wall W1 has a fixing hole WH, and the second side wall W2 also has a fixing hole WH, which are corresponding to the protruding blocks PB of the vertical parts D1 of the above two extending wings ED. With this structure, the top cover TC can be securely fixed to the top surface TS.

There is an included angle between the inclined part D2 and the vertical part D1. Therefore, the user can insert a tool (such as a screwdriver) into the inclined part D2 to open the top cover TC. In this way, the user can conveniently perform wiring operations.

The embodiment just exemplifies the present invention and is not intended to limit the scope of the present invention; any equivalent modification and variation according to the spirit of the present invention is to be also included within the scope of the following claims and their equivalents.

To sum up, according to the embodiments of the present invention, the junction box includes a first side wall, a second side wall, a third side wall and a top surface. The first side wall has a first locking edge, a first inclined edge, and a first fixing edge. The first locking edge is connected to the first fixing edge via the first inclined edge. The second side wall is opposite to the first side wall, and has a second locking edge, a second inclined edge, and a second fixing edge. The second locking edge is connected to the second fixing edge via the second inclined edge. The third side wall is opposite to the fourth side wall. The top surface has four side edges. The first side wall, the second side wall, the third side wall, and the fourth side wall extend from the four side edges, respectively. The shapes of the first side wall and the second side wall are corresponding to the shape of the backboard of the panel light. Thus, the junction box described above can be detachably fixed to the backboard, so the installation process thereof can be simple. Therefore, the junction box is very convenient in use and more comprehensive in application.

According to the embodiments of the present invention, the junction box can be detachably fixed to the backboard of the panel light, and the junction box can protrude from the backboard. The above-described structural design can effectively increase the internal space of the junction box, such that the junction box can accommodate more electric wires. Therefore, the structural design of the junction box can indeed satisfy actual requirements.

Also, according to the embodiments of the present invention, the junction box can be detachably fixed to the backboard of the panel light, so the junction box can be used as an accessory attached to the panel light and sold as a separate product. Additionally, the structural design of the junction box is simple. Therefore, the manufacturing cost and transportation cost of the junction box can be greatly reduced, so the overall cost of the panel light can be decreased. Thus, the junction box can conform to the needs of different applications.

Further, according to the embodiments of the present invention, the junction box has a first side wall, a second side wall, a third side wall, a fourth side wall, and a top surface. Several knock-out holes are distributed on these components, and each knock-out hole can be used to connect electric wires. The shapes of the first side wall and the second side wall are corresponding to the shape of the step structure. The first locking edge and the first fixing edge of the first side wall can be fixed to the backboard of the panel light, and the first locking edge is connected to the first fixing edge via the first inclined edge of the first side wall. The second locking edge and the second fixing edge of the second side wall can be fixed to the backboard, and the second locking edge is connected to the second fixing edge via the second inclined edge of the second side wall. Via the design of the composite fixing structure integrating the inclined surface, locking edges, and fixing edges with each other, the junction box can effectively withstand external forces applied to the first side wall, the second side wall, the third side wall, the fourth side wall, and the top surface. Therefore, the junction box can achieve high structural stability.

Moreover, according to the embodiments of the present invention, the first locking edge of the first side wall of the junction box has a first locking portion. The first locking portion is a locking sheet, and there is an included angle between the locking sheet and a horizontal plane parallel to the top surface. When the locking sheet is fixed to the backboard of the panel light, the structure of the locking sheet can provide a downward torsion. The structural design of the inclined locking sheet can push the junction box towards the backboard of the panel light, thereby stabilizing the junction box more effectively on the backboard. Therefore, the structural stability of the junction box can be further improved.

Furthermore, according to the embodiments of the present invention, the shapes of the first side wall and the second side wall of the junction box are corresponding to the shape of the step structure of the panel light. Additionally, the first locking edge of the first side wall has an inclined structure. With the above structure, the gap between the junction box and the backboard of the panel light can be reduced to prevent dust or other foreign objects from entering the junction box so as to effectively avoid that the panel light malfunctions. Therefore, the reliability of the panel light can be effectively improved, and the service life of the panel light can be extended.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high structural stability junction box applicable to a panel light, comprising:
    a first side wall having a first locking edge having a first locking portion, a first inclined edge, and a first fixing edge having a first fixing wing, wherein the first locking edge is connected to the first fixing edge via the first inclined edge;
    a second side wall opposite to the first side wall, and having a second locking edge having a second locking portion, a second inclined edge, and a second fixing edge having a second fixing wing, wherein the second locking edge is connected to the second fixing edge via the second inclined edge;
    a third side wall;
    a fourth side wall opposite to the third side wall; and
    a top surface having four side edges, wherein the first side wall, the second side wall, the third side wall, and the fourth side wall extend from the four side edges, respectively;
    wherein the panel light comprises a backboard having a step structure, and the step structure comprises a top plane, a plurality of inclined planes, and an outer ring portion, wherein the first locking edge, the first inclined edge, and the first fixing edge are in contact with the outer ring portion, one of the inclined planes, and the top plane, respectively, wherein the first locking portion is fixed to the outer ring portion, and the first fixing edge is fixed to the top plane via the first fixing wing, wherein the second locking edge, the second inclined edge, and the second fixing edge are in contact with the outer ring portion, one of the inclined planes, and the top plane, respectively, wherein the second locking portion is fixed to the outer ring portion, and the second fixing edge is fixed to the top plane via the second fixing wing.

2. The high structural stability junction box as claimed in claim 1, wherein the first locking portion is a locking sheet, and there is an included angle between the locking sheet and a horizontal plane, wherein the horizontal plane is parallel to the top surface.

3. The high structural stability junction box as claimed in claim 1, wherein the first side wall has a first knock-out hole, the second side wall has a second knock-out hole, the third side wall has a third knock-out hole, and the top surface has a top knock-out hole.

4. A panel light having a high structural stability junction box, comprising:
    a backboard having an opening and a step structure, wherein the opening is disposed on one side of the backboard, and the step structure is disposed on another side of the backboard, and the step structure comprises a top plane, a plurality of inclined planes, and an outer ring portion;
    a light source board disposed inside the backboard;
    a light cover disposed on the backboard and covering the opening; and
    a junction box disposed on the step structure, and having a first side wall, a second side wall opposite to the first side wall, a third side wall, a fourth side wall opposite to the third side wall, and a top surface, wherein a shape of the first side wall and a shape of the second side wall are corresponding to a shape of the step structure, wherein the first side wall has a first locking edge having a first locking portion, a first inclined edge, and a first fixing edge having a first fixing wing, and the first locking edge is connected to the first fixing edge via the first inclined edge, wherein the second side wall has a second locking edge having a second locking portion, a second inclined edge, and a second fixing edge having a second fixing wing, and the second locking edge is connected to the second fixing edge via the second inclined edge, wherein the top surface has four side edges, and the first side wall, the second side wall, the third side wall, and the fourth side wall extend from the four side edges, respectively;
    wherein the first locking edge, the first inclined edge, and the first fixing edge are in contact with the outer ring portion, one of the inclined planes, and the top plane, respectively, wherein the first locking portion is fixed to the outer ring portion, and the first fixing edge is fixed to the top plane via the first fixing wing, wherein the second locking edge, the second inclined edge, and the second fixing edge are in contact with the outer ring portion, one of the inclined planes, and the top plane, respectively, wherein the second locking portion is fixed to the outer ring portion, and the second fixing edge is fixed to the top plane via the second fixing wing.

5. The panel light having a high structural stability junction box as claimed in claim 4, wherein the first locking portion is a locking sheet, and there is an included angle between the locking sheet and a horizontal plane, wherein the horizontal plane is parallel to the top surface.

6. The panel light having a high structural stability junction box as claimed in claim 4, wherein the first side wall has a first knock-out hole, the second side wall has a second knock-out hole, the third side wall has a third knock-out hole, and the top surface has a top knock-out hole.

* * * * *